Oct. 18, 1960 W. LIPP ET AL 2,956,315
WINDOW
Filed July 24, 1957
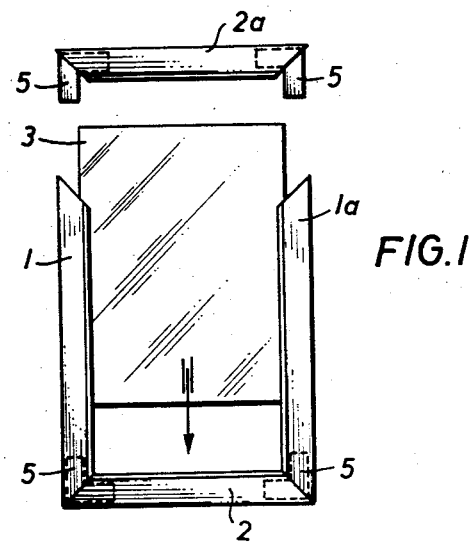
FIG.1
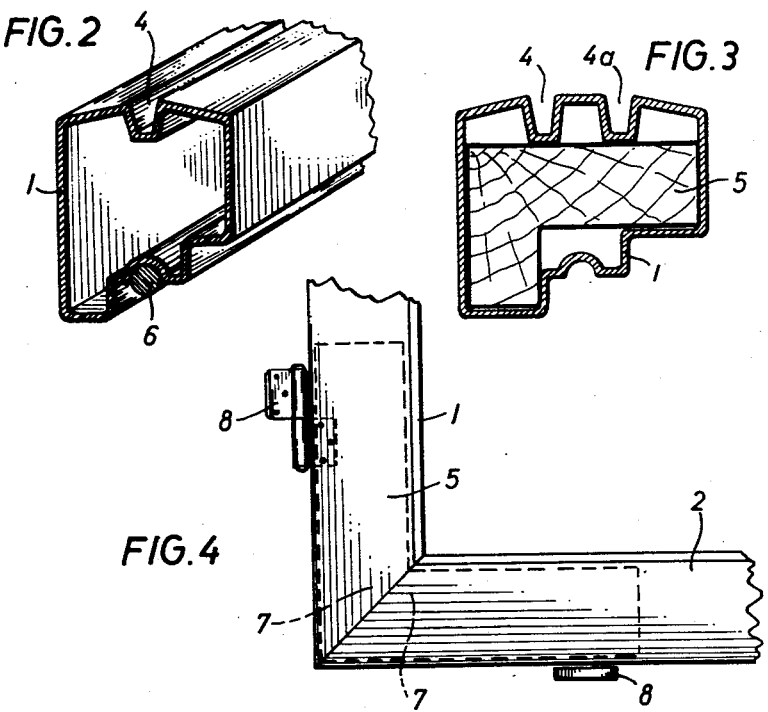
INVENTORS
Wilhelm Lipp
AND
Hans Mann
BY Michael S. Striker
ATTORNEY

United States Patent Office 2,956,315
Patented Oct. 18, 1960

2,956,315

WINDOW

Wilhelm Lipp and Hans Mann, both of Konigshofen, Taunus, Germany

Filed July 24, 1957, Ser. No. 673,843

Claims priority, application Germany June 8, 1957

6 Claims. (Cl. 20—56)

The present invention relates to windows and more particularly to windows the frames thereof are made from plastic.

At the present time windows are usually made with wooden frames and such windows have the disadvantage that the frames thereof warp easily and require also constant painting to prevent the same from rotting. Window frames have therefore been made lately from iron, which frames do not warp but which have the disadvantage that they are exceedingly heavy and also require constant repainting to prevent the iron frame from rusting. To overcome the disadvantages of such iron frames, window frames have been made also from anodized aluminum profiles, but such window frames are exceedingly expensive. Experiments have also been made to form the window frames from plastic and for this purpose solid plastic profiles similar to the usual profiles of wooden window frames have been used, which were fused or cemented together at the abutting corner thereof to form closed window frames. Such window frames can be made in all colors and have not to be repainted and such window frames will also not deteriorate due to exposure to all kind of weather. However, these experiments were not successful, since such window frames were exceedingly heavy and expensive.

It is one object of the present invention to overcome the disadvantages of window frames according to the prior art.

It is a further object of the present invention to make windows with plastic window frames which are exceedingly light.

It is an additional object of the present invention to make windows with plastic frames which are exceedingly light and in which the window pane will be held securely in the plastic frame.

It is yet an additional object of the present invention to make such windows from few and simple parts which can be manufactured at reasonable cost and assembled with each other in a very expedient manner.

With these objects in view, the window of the present invention comprises a window frame including a plurality of plastic frame members formed of hollow profiles arranged in one plane and abutting wtih the end thereof in angular relationship to each other to form a closed frame, and a plurality of rigid angular connecting members respectively press-fitted with the legs thereof in the abutting ends of the hollow frame members so as to hold th frames members in abutting relationship, and a window pane held in the frame.

Preferably the hollow plastic frame members are formed by extrusion and each of the frame members is formed at least at the inner face thereof with a groove extending over the whole lengths of this frame member and the window pane is held in this groove. To simplify the manufacturing of the connecting members the same are made with plane faces which contact the grooved faces of the frame members only at the innermost portions thereof without matching the contour of the grooved face of the frame members.

Preferably, the frame members and the connecting members are further held together by either gluing or cementing the legs of the connecting members into the hollow ends of the frame members or by fastening connecting members and frame members by screws to each other. Preferably the abutting edges of the frame members are fused together by applying an appropriate solvent thereto or by filling the small gap between the abutting edges with an appropriate lacquer.

Metal fittings may also be fastened to the frame members at the region of the connecting members and the legs of the connecting members may be made long enough so that the metal fittings can be attached at their usual location to the frame.

The various elements of the window of the present invention are preferably assembled with each other by forming first a substantial U-shaped frame open at one end from three of the frame members and two of the connecting members respectively inserted at adjacent ends of these three frame members, inserting then the window pane into grooves of the three frame members forming the U-shaped frame, inserting then one end of a connecting member into each of the opposite open ends of the fourth frame member, and finally inserting the other ends of these two connecting members respectively into the open ends of the parallel frame members of the U-shaped frame to form thus a rectangular closed frame from the frame members with the window pane held in the grooves thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of the window of the present invention showing one of the frame members detached from the other members of the frame and illustrating the method of assemblying the window of the present invention;

Fig. 2 is a partially sectioned perspective partial view of a frame member of the present invention;

Fig. 3 is a cross-section through a frame member and the connecting member inserted therein, the cross-section being taken substantially normal to the longitudinal direction of the frame member; and Fig. 4 is a partial front view of the window frame with metal fittings attached thereto.

Referring now to the drawings, and more particularly to Figs. 1 and 2 of the same, it will be seen that the window of the present invention is preferably formed from four profiled, hollow, plastic frame members 1, 1a, 2 and 2a which are held in an abutting relationship by rectangular connecting members 5, the legs thereof are respectively press-fitted into the abutting hollow ends of the frame members. Each of the frame members is preferably formed at one face thereof with a substantially trapezoidal groove 4 and the frame members are connected together so that the grooves 4 on each frame member are respectively located at the inner faces of the frame members so that a window pane 3 may be held in the grooves 4 of the frame members. If it is desired to hold two parallel window panes and the frame members, these frame members are provided with two parallel grooves 4 and 4a as illustrated in Fig. 3. The profile of the hollow plastic frame member may otherwise be made in any desired shape and the face opposite the face in which the groove 4 is provided is preferably formed with a groove 6 adapted to receive a guide rail and/or a weatherproofing strip. The hollow plastic frame members are preferably formed by extruding the profiles in an extrusion press and then cutting these profiles to the desired lengths. The ends of the individual frame members are preferably cut with a slant so that the ends will abut against each other as most clearly shown in Fig. 4.

To simplify the manufacture of the connecting members the same are preferably made with plane faces as best shown in Fig. 3 so that the connecting members 5 contact the grooved faces of the frame members only at the innermost straight portions thereof, without matching exactly the contour of the inner faces of the frame members.

The connecting member 5 has in a preferred embodiment in the present invention an L-shaped cross-section, as shown in Fig. 3, which is dimensioned in such a way that it will fit without play into the hollow profile of the frame member 1.

The connecting members 5 are preferably made of wood and each of the connecting members may be made out of two pieces, united with each other by gluing, pegging or in any other well known manner.

The window of the present invention may also be provided with necessary metal fittings 8 for hinging the metal frame to the wall or for locking the metal frame into the wall opening. The legs of the connecting members 5 are made long enough so that the metal fittings 8 may be attached for instance by screws or any other convenient manner at their usual location to the window frame. If metal fittings have to be attached at a distance from the corners of the frame which would necessitate too great a length of the connecting member, a separate wooden insert may be provided in the frame member at the location at which the metal fitting is to be attached or the metal fitting may be attached to a separate plastic plate which may be welded or cemented to the respective frame member.

The frame members are respectively fixedly secured to the connecting members 5 by gluing or cementing the legs of the connecting members 5 respectively in the abutting hollow ends of the frame members or the frame members may be secured to the connecting members 5 by screws 7, schematically indicated in dotted lines in Fig. 4. The abutting edges of the connecting members are preferably united by applying an appropriate solvent to these edges so as to fuse the same together, or the small gap between the abutting edges of the frame members may be filled with an appropriate lacquer.

A preferred method of assembling the elements of the window of the present invention is shown in Fig. 1. As shown therein the hollow plastic frame members 1, 2 and 1a are respectively united by a pair of connecting members 5 to form a substantially U-shaped frame open at one end. The frame members are united to each other so that the groove 4 provided on each of the frame members is located at the inner face of each frame member. A window pane 3 is then pushed, in the direction of the arrow, through the open end of the U-shaped frame so as to be held at three edges thereof in the grooves of the frame members 1, 2 and 1a. Two connecting members 5 are then respectively inserted with one leg thereof in opposite ends of the frame member 2a and the free ends of these connecting members 5 are then respectively inserted into the open free ends of the frame members 1 and 1a to complete a rectangular frame enclosing the window pane 3. The connecting members 5 may then be fixedly connected to the respective frame members, as mentioned above, by gluing or by screws and the abutting edges of the frame members may be used together by applying an appropriate solvent to these edges.

It will be understood that each of the elements described above, or two or more together, may also find a useful application in other types of window differing from the types described above.

While the invention has been illustrated and described as embodied in a window the frame of which is formed from hollow plastic profiles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a window frame, comprising, in combination, a frame consisting of a synthetic resin and including a plurality of frame members, each frame member having a hollow closed profile having a cross-section of substantially L-shaped configurations, said frame members abutting each other at the ends thereof to form said frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, respectively, press-fitted in the abutting ends of said hollow frame members and secured to each other so to hold said frame members in abutting relationship, each of said connecting members having a cross-section of L-shaped configuration and contacting said ridge of the respective frame member only at the innermost portion thereof.

2. A window frame, comprising, in combination, a frame consisting of a synthetic resin and including two pairs of opposite frame members, each frame member having a hollow closed profile having a cross-section of substantially L-shaped configurations, said frame members having mitered ends, adjacent mitered ends abutting each other to form a rectangular closed frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, each connecting member having two legs extending at 90° to each other, respectively, press-fitted in the abutting ends of said hollow frame members and secured to each other so to hold said frame members in abutting relationship, each of said connecting members having a cross-section of L-shaped configuration and contacting said ridge of the respective frame member only at the innermost portion thereof.

3. A window frame comprising, in combination, a frame consisting of a synthetic resin and including a plurality of frame members, each frame member having a hollow closed profile having a cross-section of substantially L-shaped configurations, said frame members abutting each other at the ends thereof to form said frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, each connecting member having two legs, each leg having a mitered face abutting the mitered face of the other leg, said mitered faces of said legs being adhesively attached to each other, said legs being respectively press-fitted in the abutting ends of said hollow frame members, each of said connecting members having a cross-section of L-shaped configuration and contacting said ridge of the respective frame member only at the innermost portion thereof.

4. A window frame, comprising, in combination, a frame consisting of a synthetic resin and including a plurality of frame members, each frame member having a hollow closed profile having a cross-section of substantially L-shaped configurations, said frame members having mitered ends, adjacent mitered ends abutting each other to form a rectangular closed frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, each connecting member having two legs extending at 90° to each other, respectively, press-fitted in the abutting ends of said hollow frame members and secured to each other so to hold said frame members in abutting relationship, each of said connecting members contacting said ridge of the respective frame member only at the innermost portion thereof.

5. A window frame, comprising, in combination, a frame consisting of a synthetic resin and including two pairs of opposite frame members, each frame member having a hollow closed profile having a cross-section of substantially L-shaped configurations, said frame members having mitered ends, adjacent mitered ends abutting each other to form a rectangular closed frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, each connecting member having two legs extending at 90° to each other, respectively, press-fitted in and adhesively secured to the abutting ends of said hollow frame members and secured to each other so to hold said frame members in abutting relationship, each of said connecting members having a cross-section of L-shaped configuration and contacting said ridge of the respective frame member only at the innermost portion thereof.

6. A window frame, comprising, in combination, a frame consisting of a synthetic resin and two pairs of opposite frame members, each frame member having a hollow closed profile having a cross-section of substantially L-shaped configurations, said frame members having mitered ends, adjacent mitered ends abutting each other to form a rectangular closed frame, each of said frame members having an inner face confronting the inner face of an opposite frame member and being formed at said inner face thereof with at least one groove extending over the whole length of said frame member and adapted to receive and hold an edge portion of a pane, said groove forming a ridge inside the respective frame member and a plurality of rigid non-metallic connecting members, each connecting member having two legs extending at 90° to each other, respectively, press-fitted in and adhesively secured to the abutting ends of said hollow frame members and secured to each other so to hold said frame members in abutting relationship, each of said connecting members having a cross-section of L-shaped configuration and contacting said ridge of the respective frame member only at the innermost portion thereof; metal fittings mounted on said frame members in the region of said connecting members; and means for fastening said metal fittings to said frame members and to said connecting members.

References Cited in the file of this patent

UNITED STATES PATENTS

| | | |
|---|---|---|
| 2,538,925 | Steffan | Jan. 23, 1951 |
| 2,703,159 | Van Fleet | Mar. 1, 1955 |
| 2,709,489 | Keebler | May 31, 1955 |
| 2,753,603 | Strawther | July 10, 1956 |
| 2,767,443 | Hobein et al. | Oct. 23, 1956 |